(12) United States Patent
Janikowski et al.

(10) Patent No.: US 8,821,722 B2
(45) Date of Patent: *Sep. 2, 2014

(54) FILTER SYSTEM WITH VIBRATION DAMPENING

(75) Inventors: Eric Janikowski, Jefferson, WI (US); Kevin C. South, Cookeville, TN (US); Barry Verdegan, Stoughton, WI (US); Ismail Bagci, Cookeville, TN (US); Hendrik Amirkhanian, Cookeville, TN (US); Melvin D. McCormick, Cookville, TN (US); Chad Thomas, Algood, TN (US)

(73) Assignee: Cummins Filtration IP, Inc., Minneapolis, MN (US)

(*) Notice: Subject to any disclaimer, the term of this patent is extended or adjusted under 35 U.S.C. 154(b) by 2157 days.

This patent is subject to a terminal disclaimer.

(21) Appl. No.: 11/821,894

(22) Filed: Jun. 26, 2007

(65) Prior Publication Data

US 2009/0001005 A1    Jan. 1, 2009

(51) Int. Cl.
*F01M 11/03* (2006.01)
*B01D 37/00* (2006.01)

(52) U.S. Cl.
USPC ............... 210/171; 210/167.02; 210/232

(58) Field of Classification Search
USPC ................................................. 210/171
See application file for complete search history.

(56) References Cited

U.S. PATENT DOCUMENTS

| | | | |
|---|---|---|---|
| 2,427,505 A | 9/1947 | Newcomb | |
| 2,707,051 A * | 4/1955 | Mailhot et al. | 210/137 |
| 3,695,437 A * | 10/1972 | Shaltis | 210/136 |
| 4,150,588 A | 4/1979 | Brewer | |
| 4,256,579 A | 3/1981 | Rose et al. | |
| 4,287,317 A * | 9/1981 | Kitagawa et al. | 525/309 |
| 4,287,917 A | 9/1981 | Frey | |
| 4,557,834 A | 12/1985 | Mason | |
| 5,549,821 A | 8/1996 | Bounnakhom et al. | |
| 5,904,357 A | 5/1999 | Demirdogen et al. | |
| 5,906,736 A | 5/1999 | Bounnakhom et al. | |
| 5,996,810 A | 12/1999 | Bounnakhom et al. | |
| 6,019,229 A | 2/2000 | Rao | |
| 6,318,329 B1 | 11/2001 | Sato | |
| 6,554,140 B2 | 4/2003 | Steger et al. | |
| 6,896,803 B2 * | 5/2005 | Cline et al. | 210/248 |
| 6,907,865 B1 | 6/2005 | Hanby | |
| 6,974,538 B2 | 12/2005 | Baumann et al. | |
| 2005/0000876 A1 | 1/2005 | Knight | |
| 2005/0103692 A1 | 5/2005 | Stanhope et al. | |
| 2006/0118480 A1 | 6/2006 | Inoue | |
| 2009/0001004 A1 | 1/2009 | McCormick et al. | |

OTHER PUBLICATIONS

Vibrostop, MOPLA 1 GG, 2002, PDF.*
"Tuned Absorbers/Damper," DEICON Dynamics & Control, http://www.deicon.com/tuned_abs_damper.html, accessed Jun. 22, 2011.
Yang, "Stress, Strain, and Structural Dynamics: An Interactive Handbook of Formulas, Solutions, and MATLAB Toolboxes," Burlington, MA: Elsevier Inc., 2005, p. 475-476.

* cited by examiner

*Primary Examiner* — Vickie Kim
*Assistant Examiner* — Allison Fitzsimmons
(74) *Attorney, Agent, or Firm* — Foley & Lardner LLP

(57) ABSTRACT

A filter is described that is combined with a device to address vibrations. Such vibrations can adversely impact filter performance. An engine system including this combination is also described.

1 Claim, 9 Drawing Sheets

US 8,821,722 B2

FILTER SYSTEM WITH VIBRATION DAMPENING

BACKGROUND

The present application relates to fuel or liquid filtering, and more particularly, but not exclusively, relates to dampening of vibrations in fuel filters to improve the efficiency of the filter.

During operation, internal combustion engines receive fuel from a fuel system. To meet emission standards and to optimize performance, the fuel from the fuel system undergoes filtering to remove unwanted particles, water, or other constituents. Vibrations from the engine and equipment/vehicle are sometimes transferred to the fuel filter and may result in a loss of filtering efficiency. Large amounts of vibration may cause water and particle re-entrainment back into the fluid being filtered. Additionally, the effect of the vibration can degrade the structural integrity of the filtration system.

It has been discovered that typical filter systems are designed and validated to specifications that define capacity and efficiency based on industry-standard testing, which does not account for the effects of vibrations. Thus, a need persists for further contributions in this area of technology.

SUMMARY

One embodiment of the present application includes a unique vibration dampener associated with a fuel filter to minimize vibration effects on the filter. Other embodiments include unique apparatus, devices, systems, and methods to minimize or counteract vibrations impacting fuel filter efficiency. Further embodiments, forms, objects, features, advantages, aspects, and benefits of the present application shall become apparent from the detailed description and figures included herewith.

BRIEF DESCRIPTION OF THE DRAWING

The figures are not necessarily to scale, emphasis instead being placed upon illustrating the principles of the invention. Moreover, in the figures, like reference numerals designate corresponding parts throughout the different views.

FIG. 9b is a diagrammatic view of an alternative embodiment of the vibration dampener of FIG. 9a.

DETAILED DESCRIPTION OF SELECTED EMBODIMENTS

Figure 1:
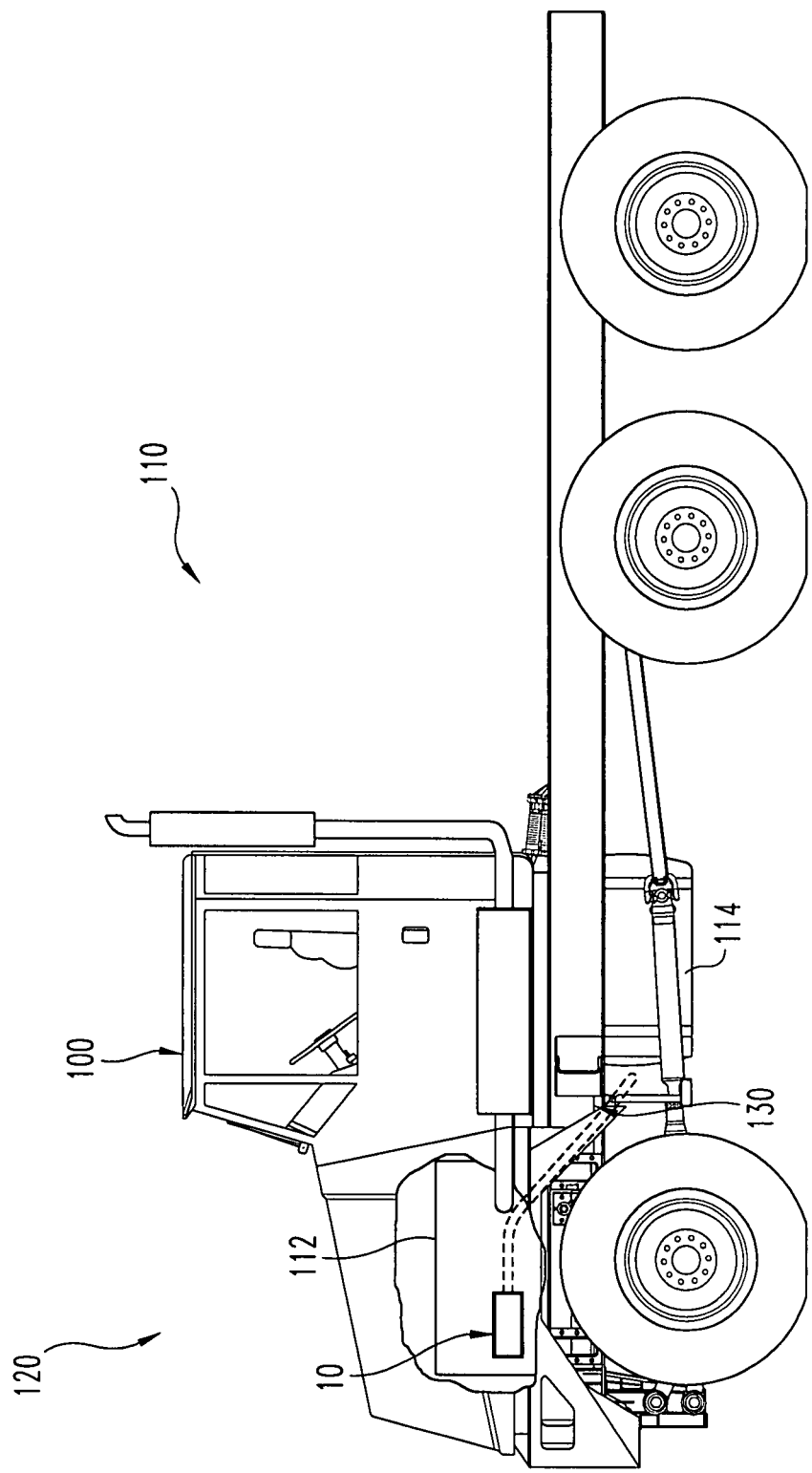
FIG. 1 is a partially diagrammatic view of a vehicle with an internal combustion engine system.

While the present application can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments and any further applications of the principles described herein are contemplated as would normally occur to one skilled in the art to which the invention relates.

FIG. 1 depicts a vehicle system 110 including a vehicle 100 in the form of a semi-tractor, but could alternatively be any of a variety of other vehicle types such as a light, medium, or heavy duty truck, bus, car, SUV, motor coach, or different variety of land traveling vehicle. In other embodiments, the vehicle may be of a marine or aircraft type. Vehicle 100 includes a fuel tank 114 and an internal combustion engine system 120 which includes an engine 112. Additionally, the internal combustion engine system 120 further includes a fueling subsystem 130 coupled to fuel tank 114 for providing fuel from fuel tank 114 to engine 112. System 110 further includes a liquid filtering subsystem 10. Engine 112 is of a reciprocating piston type that is configured for compression ignition and direct injection or port-injected diesel fueling. However, in other embodiments, engine 112 may be of a different configuration and/or utilize a different fuel type.

While the present disclosure will be with reference to a fuel filter for filtering fuel it is contemplated that forms of the present application will be applicable to other fluid filtering engine components including, but not limited to, air filters, oil filters, transmission fluid filters, liquid fuel, gaseous fuel, or different fluid filter types. In still other embodiments, the teachings of the present application are implemented in filtering systems for nonengine applications, such as pumps, hydraulic equipment, and pneumatic equipment to name just a few examples.

Figure 2:
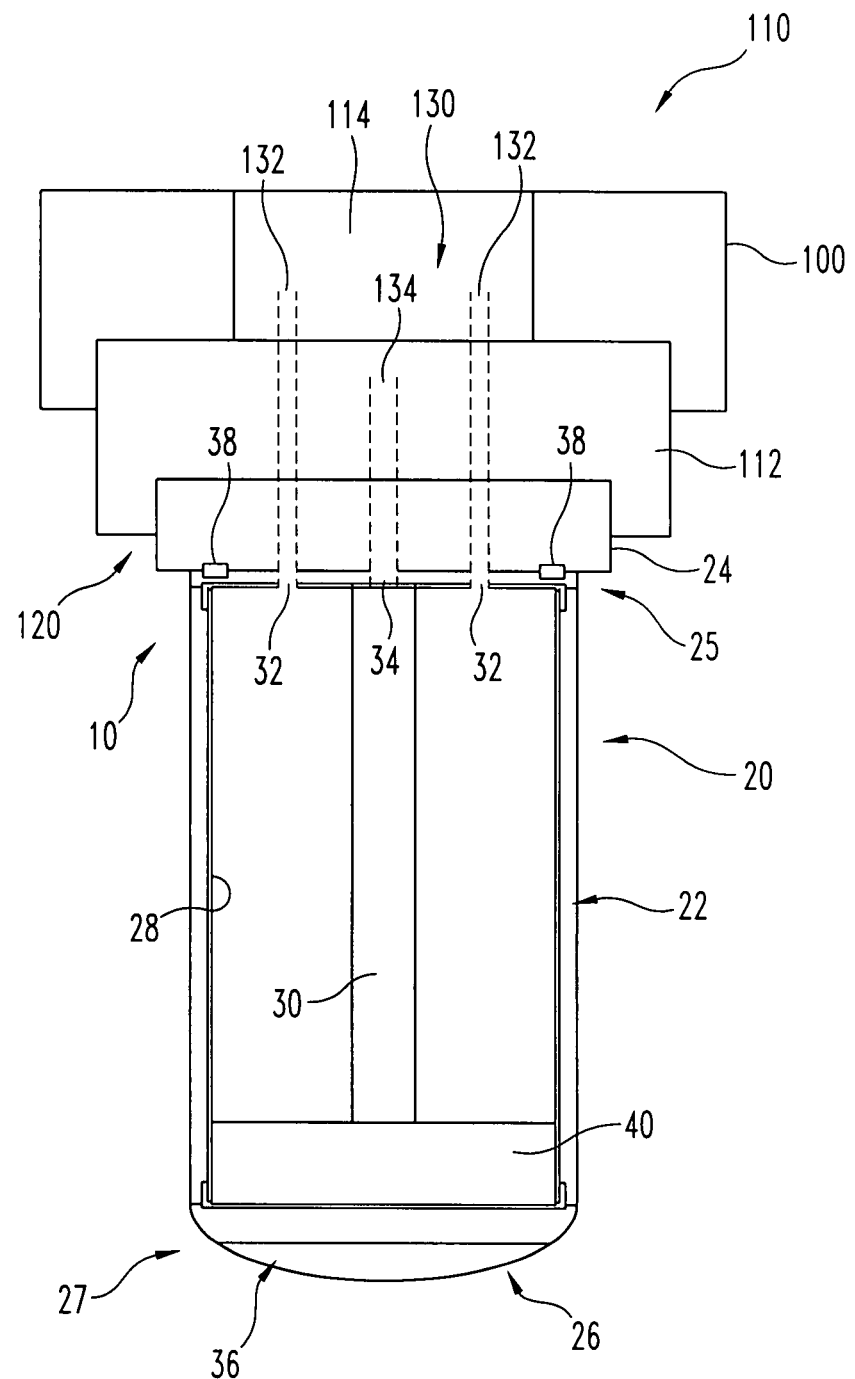
FIG. 2 is a partially diagrammatic view of a filter system associated with the internal combustion engine system of FIG. 1.

Referring additionally to the non-limiting diagrammatic view of FIG. 2, the fuel as provided to engine 112 by fuel interface 130 typically includes some undesirable constituents. Such constituents typically include a certain amount of particulate matter, water, and/or other types of contaminates. An engine liquid filter 20 is included in liquid filtering subsystem 10 to remove at least some of these constituents. Filter 20 includes a housing 22 extending from a mounting interface 24 at a mounting end 25 to a dome 26 at a free end 27. Housing 22 defines an interior space 28 for receipt of the fuel and a filtering element 30 is positioned within interior space 28 for filtering constituents from the fuel. Additionally, filter element 30 includes a filtering material that is selective to one or more undesirable constituents to trap or contain them relative to filtered fuel downstream of such material (filtering media). Fueling interface 130 includes a fuel inlet passage 132 and a fuel outlet passage 134. Fuel to be filtered from fuel tank 114 is provided to filter 20 through inlet passage 132 and filtered fuel is provided to engine 112 through outlet passage 134. Mounting interface 24 defines at least one inlet 32 coupled to inlet passage 132 for receiving fuel into interior space 28 and at least one outlet 34 coupled to outlet passage 134. Inlet 32 and outlet 34 are all located on mounting end 25.

Filters are typically designed and validated to specifications that define capacity and efficiency based on industry-standard testing, which does not include effects of vibration. However, it has been discovered that fluid filters can be susceptible to vibrations originating from at least one of the engine and the vehicle. Large amounts of vibration may cause water and particle re-entrainment back into the fluid being filtered. Additionally, the vibration can cause overall structural degradation of the filtering subsystem.

Dome 26 defines a free end wall 36 of filter 20 near free end 27. Additionally, filter 20 is mounted at the mounting interface 24 with filter couplings 38. By way of a nonlimiting example, couplings 38 can be complimentary threading of a spin-on filter type and/or structure corresponding to a bolt-on filter connection, just to name a couple of possibilities. Mounting end 25 of filter 20 is supported through the connection to interface 24 via couplings 38 and free end 27 is unsupported. Vibrations from engine 112 and/or vehicle 100 can potentially propagate through filter 20 effecting filter efficiency. To minimize vibrations, a vibration dampener 40 is positioned between free end wall 36 and filter element 30 to provide vibration dampening for filter 20. In some forms of the present application, vibration dampener 40 is coupled to filter element 30 so that they may be carried together in a replaceable subassembly of filter 20. In one form of the present application, vibration dampener 40 is provided partially within interior space 28. In another form of the present application, vibration dampener 40 is provided fully within interior space 28. In still another form of the present application, vibration dampener 40 may be located fully within dome 26.

Figure 3:
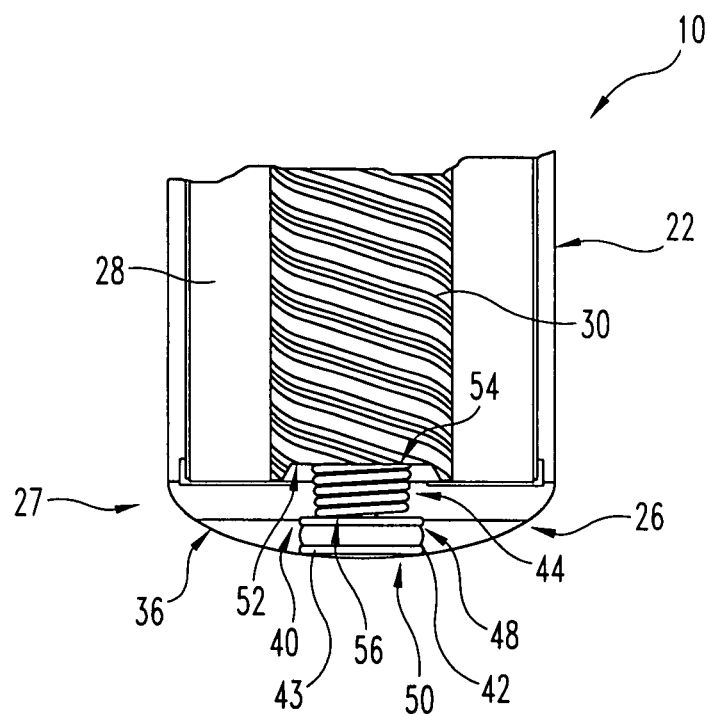
FIG. 3 is a partial, diagrammatic, sectional view of a fuel filter having a vibration dampener.
Figure 4:
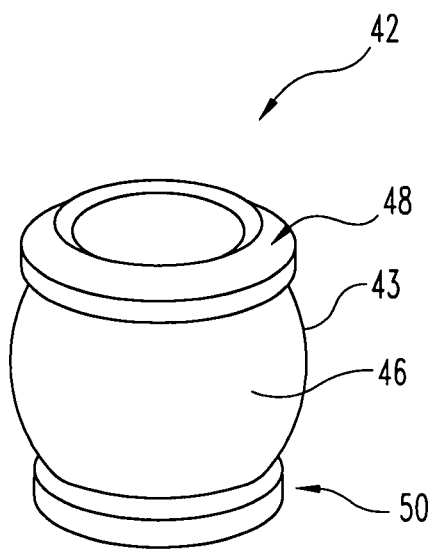
FIG. 4 is a perspective view of the vibration dampener of FIG. 3.

Referring now to FIGS. 3 and 4, vibration dampener 40 includes an elastomeric element 42 in the form of a vibration isolator 43 and a spring 44. Elastomeric element 42 includes a body 46 defined between an upper engagement end 48 and a lower engagement end 50. In FIG. 4, element 42 is shown without spring 44. In one nonlimiting embodiment, isolator 42 is formed from a high performance elastomer-polyester blend and is highly inert to most chemicals and lubricants. In one example of the present application, elastomeric element 42 is an axial type bumper available from Advanced Antivibration Components having a principal place of business in New Hyde Park, N.Y. An upper spring portion 54 of spring 44 contacts a lower end 52 of filter element 30 and a lower spring portion 56 contacts upper engagement end 48. Spring 44 biases filter element 30 towards mounting end 25. Additionally, both elastomeric element 42 and spring 44 compress and expand during operation to dampen vibrations in filter 20. In some forms of the present application, spring 44 and elastomeric element 42 may be combined within a housing (not shown).

Figure 5A:
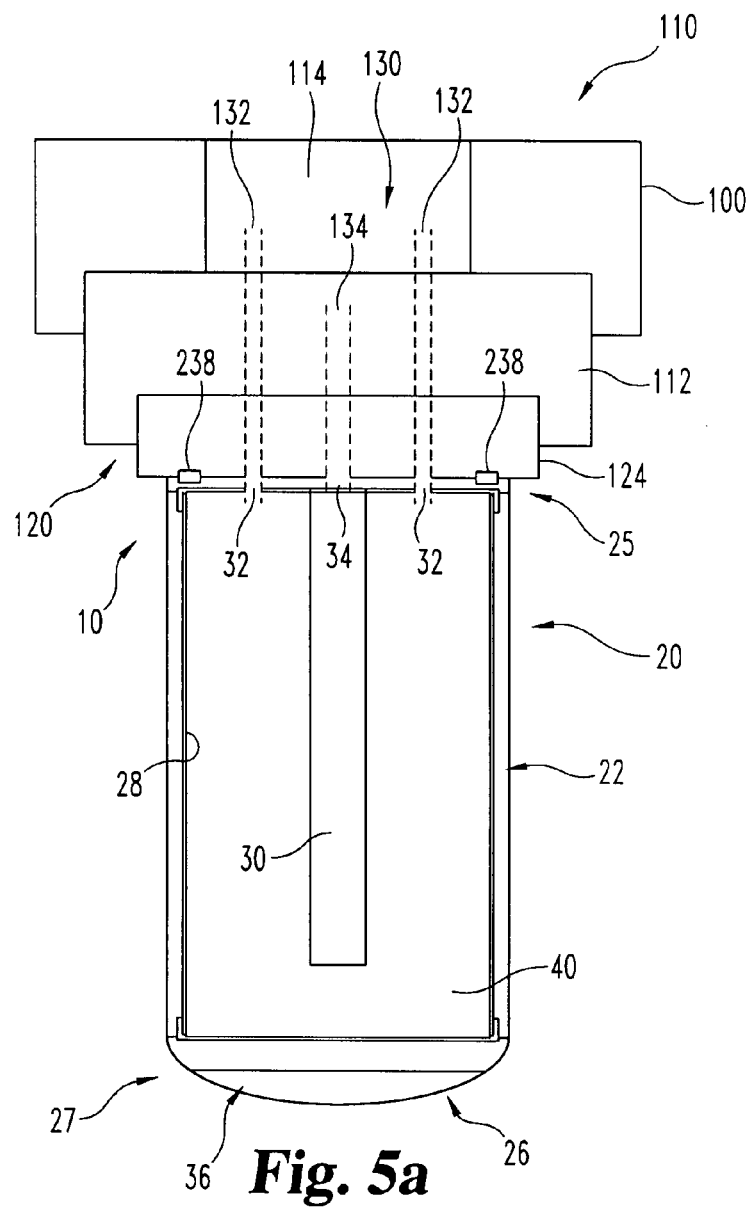
FIG. 5a is a partially diagrammatic view of an alternative filter system having a filter mount.
Figure 5B:
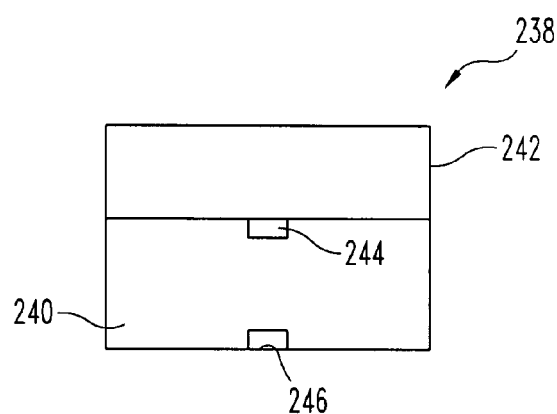
FIG. 5b is a diagrammatic view of the filter mount of FIG. 5a having a vibration dampener.

With reference to FIG. 5a there is illustrated another embodiment of vehicle system 110 indicated as vehicle system 110'; where the reference numerals previously described represent like features. Mounting end 25 of filter 20 is supported by at least one filter mount 238 carried by mounting interface 124. As shown in FIG. 5b, mount 238 includes a vibration dampener 240 and a mounting element 242. Coupling of filter 20 to system 110 can be accomplished as previously described in connection with system 110. In one form of the present application, vibration dampener 240 includes an interface portion 244 coupled to mounting element 242 and a filter interface portion 246 coupled to filter 20. As discussed above, vibrations from engine 112 and/or vehicle 100 potentially carry throughout filter 20 effecting filter efficiency. Vibration dampener 240 reduces vibration transmission through mount 238 and into filter 20.

Figure 6A:
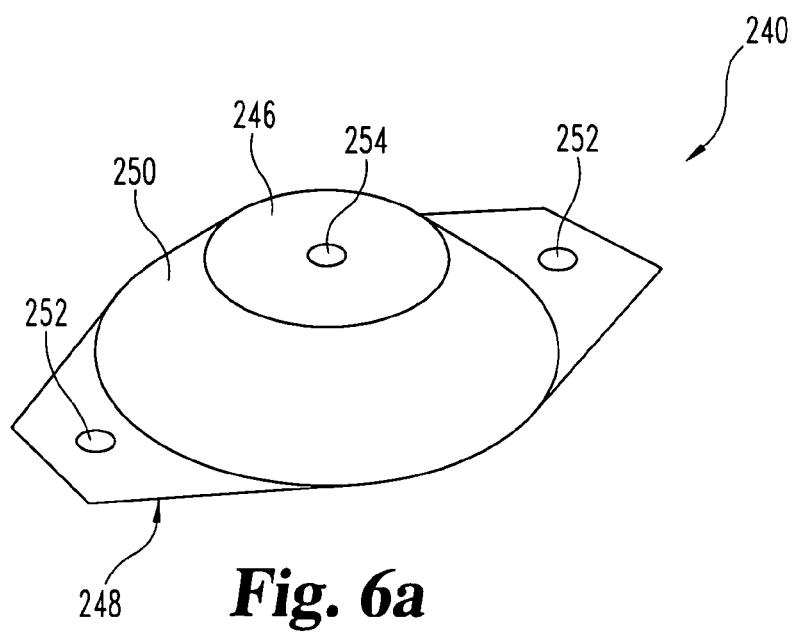
FIG. 6a is a perspective view of the vibration dampener of FIG. 5b.

As shown in FIG. 6a, vibration dampener 240 further includes a base 248 and an isolator 250. Base 248 is formed from carbon steel or another rigid material and isolator 250 is formed from rubber or a rubber based material. In one example of the present application, vibration dampener 240 is a dome type with a base mount that is available from Advanced Antivibration Components having a principal place of business in New Hyde Park, N.Y. Base 248 includes a pair of mounting holes 252 for receipt of mounting element 242. In one form of the present application, mounting element 242 is a bolt. Filter interface portion 246 includes a mounting hole 254 for receipt of a fastener with a threaded stem (not shown) to couple the interface portion 246 to filter 20. Interface portion 246 is compressible and expandable relative to base 248. The movement of interface portion 246 transmits the vibrations carried from engine 112 and/or vehicle 100 into isolator 250. Isolator 250 then absorbs or minimizes the vibration effect and reduces the transmission of the vibrations to filter 20. In some forms of the present application, mounting of vibration dampener 240 is reversed so that interface portion 246 mounts to mounting interface 24 and base 248 couples to filter 20.

Figure 6B:
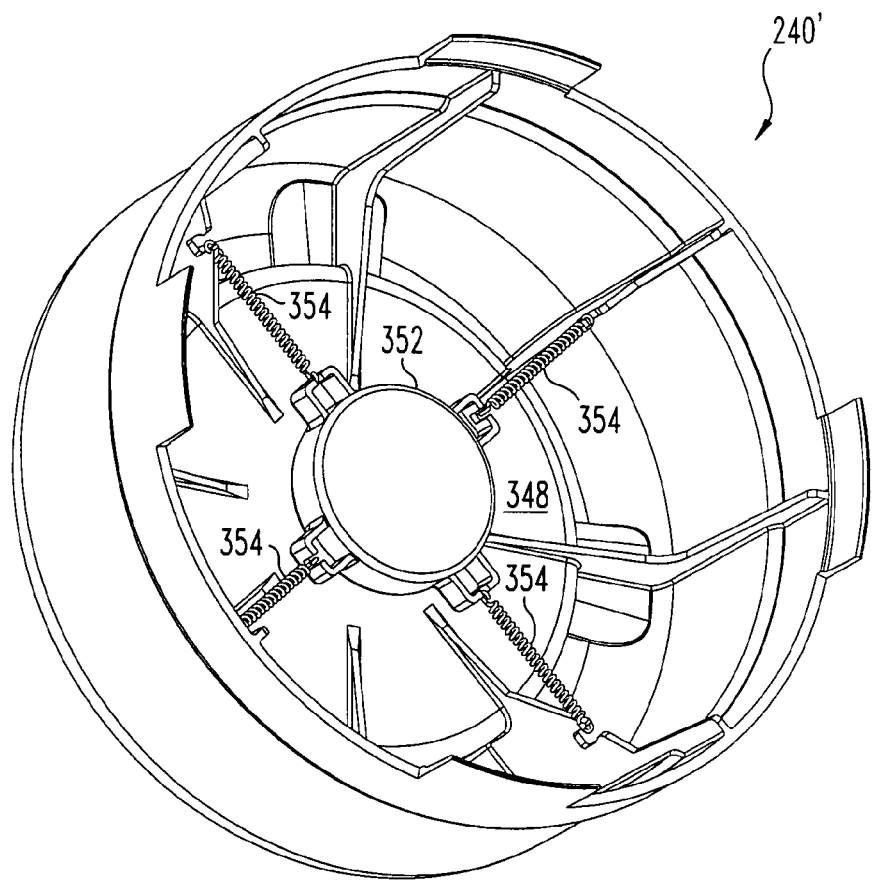
FIG. 6b is a perspective view of an alternative embodiment of the vibration dampener of FIG. 6b.

With reference to FIG. 6b there is illustrated another embodiment of vibration dampener 240 indicated as vibration dampener 240'. Vibration dampener 240' can be used in lieu of other vibration dampeners of the present invention. Vibration dampener 240' includes base 348 with a plurality of isolating springs 354. Springs 354 are coupled to plate 352 and base 348. Springs 354 bias plate 352 to a central position, but permit translation with several degrees of freedom over limited ranges relative to base 348 in response to corresponding forces. The biased movement of plate 352 relative to base 348 can be used to reduce deleterious effects of vibration. In one form of the present application, vibration dampener 240' is a suspension type spring mount available from Advanced Antivibration Components having a principal place of business in New Hyde Park, N.Y. In some forms of the present application, base 348 is secured to filter 20 by extending bolts (not shown).

It should be appreciated that when filter 20 is in use it may resonate at one or more frequencies. To counteract the resonance or vibration of filter 20, vibration dampener 240 can be modeled in terms of a mass element and an elastic, spring element. The mass of the mass element and the spring characteristics are selected to provide a degree of vibration isolation at one or more of the resonant frequencies. In one form of the present application, these characteristics are selected to "tune" vibration dampener 240 to the natural frequency of subsystem 10. See description of FIG. 8 below for additional details relating to such aspects.

Figure 7:
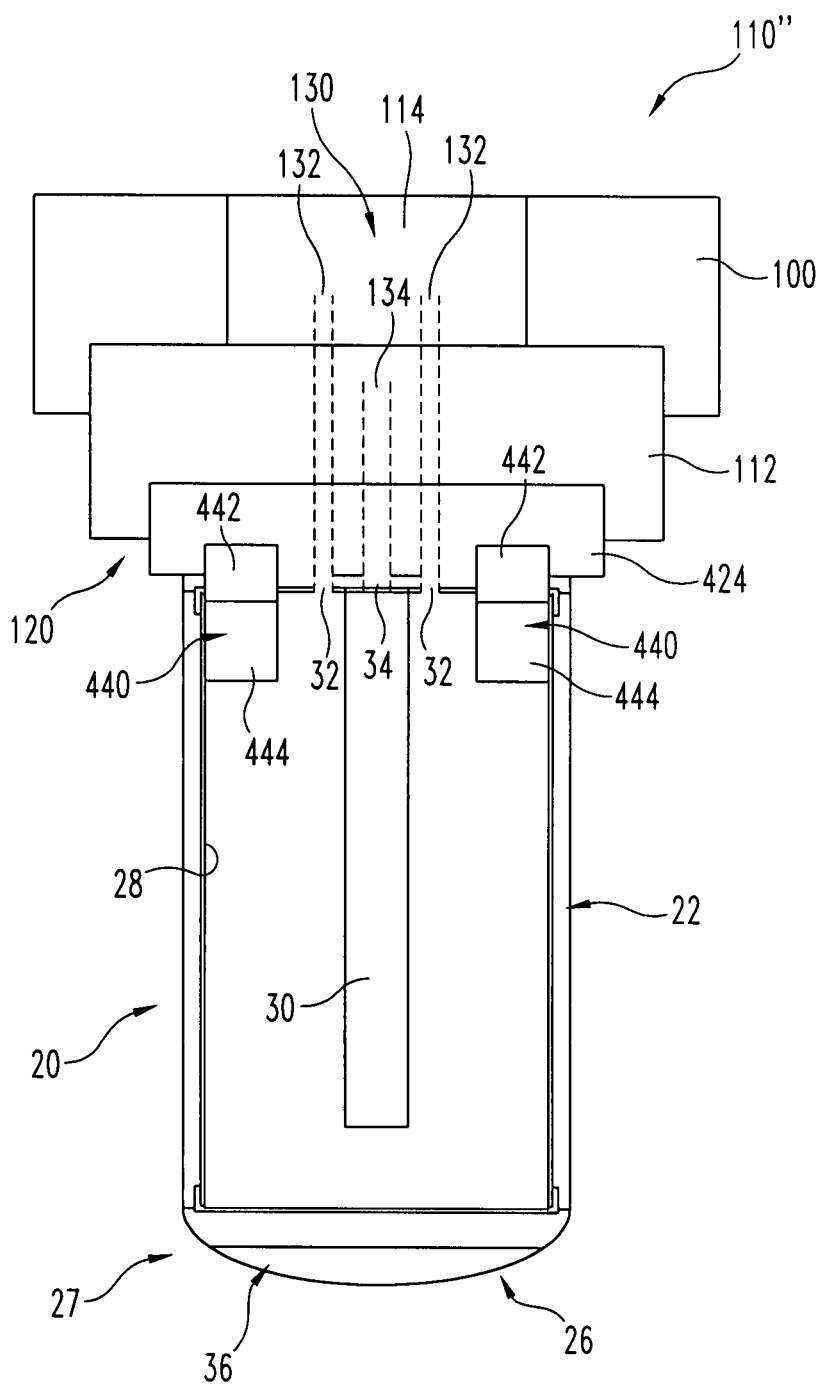
FIG. 7 is a partially diagrammatic view of an alternative filter system having a vibration dampener.

With reference to FIG. 7 there is illustrated another embodiment of vehicle system 110 indicated as vehicle system 110". Like features of system 110" and system 110 are represented by like reference numerals. Mounting end 25 of filter 20 is supported by at least one vibration dampener 440 carried by mounting interface 424 and positioned at least partially within interior space 28. Vibration dampener 440 includes a mounting element 442 and a dampening element 444. Vibration dampener 440 may include any of the previously described vibration dampeners as well as others known to those skilled in the art including a vibration dampener tuned to a natural frequency of the filter 20. See discussion of FIG. 8 below for additional details relating to vibration dampener tuning. Vibration dampener 440 is partially received within filter 20 and couples filter 20 to mounting interface 424. As discussed above, vibrations from engine 112 and/or vehicle 100 potentially carry throughout filter 20 effecting filter efficiency. Vibration dampener 240' reduces vibration transmission to filter 20 by absorbing or minimizing vibrations at the location where the filter 20 mounts to mounting interface 424.

Figure 8:
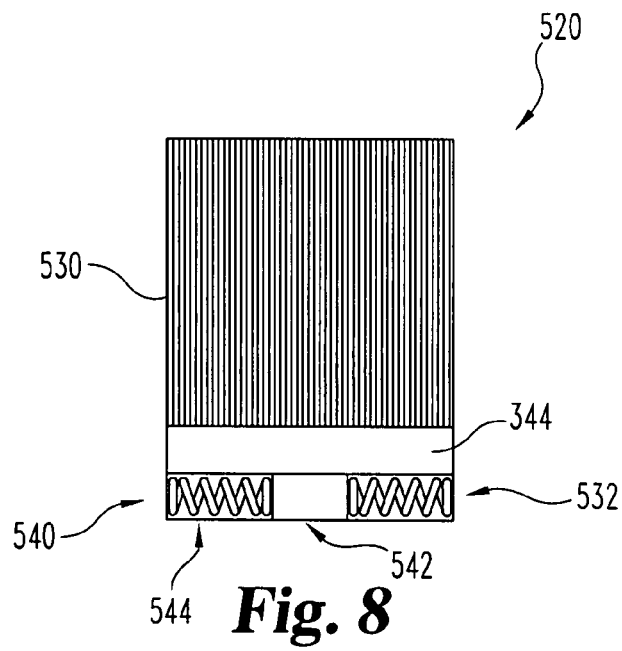
FIG. 8 is a diagrammatic view of a filter device having a vibration dampener.

With reference to FIG. 8, there is illustrated a nonlimiting diagrammatic view of a replaceable filter device 520 for insertion into a filter housing (not shown) for use with filtering subsystem 10. Filter device 520 includes a filter element 530 and a vibration dampener 540 connected to filter element 530 to be carried therewith. Vibration dampener 540 may be enclosed in a cap 332 that is a separate component from filter element 530. As shown in FIG. 8, filter device 520 further includes an end cap 334 positioned below filter element 530. Cap 332 is coupled to end cap 334 allowing a different cap to be utilized for different applications. In other forms of the present application, vibration dampener 540 is coupled directly to element 530. In one alternative, a vibration handling device includes shifting the vibration to a different frequency and/or decreasing resonant frequency amplitude in addition or in lieu of other techniques described herein. As an addition or alternative to vibration dampening/isolation, this device can also reduce the adverse effect of sudden impact, mechanical shock, acceleration, etc.

When filter device 520 is in use in the filter housing it may resonate at one or more frequencies. To counteract the resonance/vibration of filter device 520, vibration dampener 540 provides in operation an effective mass element 542 and spring element 544 both enclosed within cap 332. The characteristics of elements 542 and 544 are selected to provide a desired degree of vibration dampening at one or more of the resonate frequencies. In one form of the present application, these characteristics are selected to "tune" vibration dampener 540 to the natural frequency of subsystem 10. The system can be tuned based on spring constants, changes in absorber mass, durometer and selection of material isolators, enclosed fluid contained spring mass system can optimize the absorber by those mentioned as well as fluid viscosity.

Figure 9A:
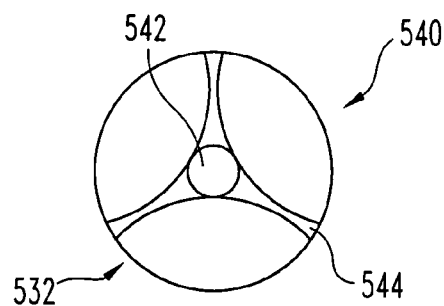
FIG. 9a is a diagrammatic view of the vibration dampener of FIG. 8.
Figure 9B:
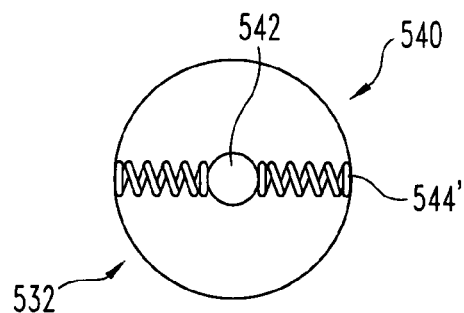

Two forms of spring element 544 are shown in FIGS. 9a and 9b. Element 544 is shown in FIG. 9a to be a plurality of leaf spring clips 544'. Element 544 is shown in FIG. 9b to be a plurality of coil springs 544". In other forms of the present application a single elastic element is utilized. In a further embodiment, end 542 at least partially engages a compressible, resilient and/or elastomeric material (i.e. embedded therein) to dampen and/or isolate as an alternative or addition to springs or clips.

Figure 10:
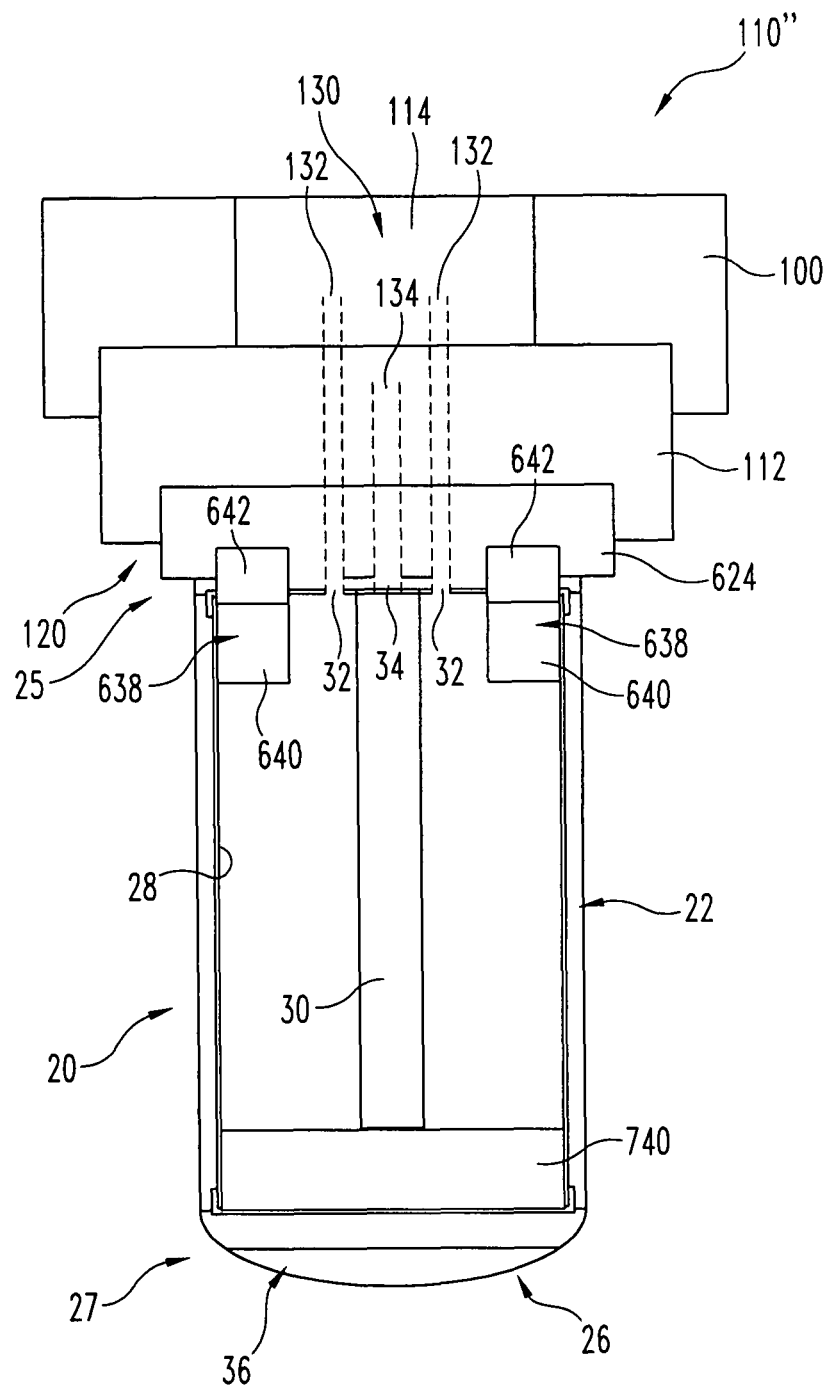
FIG. 10 is a partially diagrammatic view of another alternative filter system.

With reference to FIG. 10 there is illustrated another embodiment of vehicle system 110 indicated as vehicle system 110'''. Like features of system 110''' and system 110 are represented by like reference numerals. Mounting end 25 of filter 20 is supported by at least one filter mount 638. Additionally, at least one lower vibration dampener 740 is provided between free end wall 36 and filter element 30. Filter mount 638 is carried by mounting interface 624 and positioned at least partially within interior space 28. Filter mount 638 includes a mounting element 642 and an upper vibration dampener 640. Vibration dampeners 640, 740 may include any of the previously described vibration dampeners as well as others known to those skilled in the art including a vibration dampener tuned to a natural frequency of the filter 20. See discussion of FIG. 8 above for additional details relating to vibration dampener tuning. Filter mount 638 is at least partially received within filter 20 and couples filter 20 to mounting interface 624.

Figure 11:
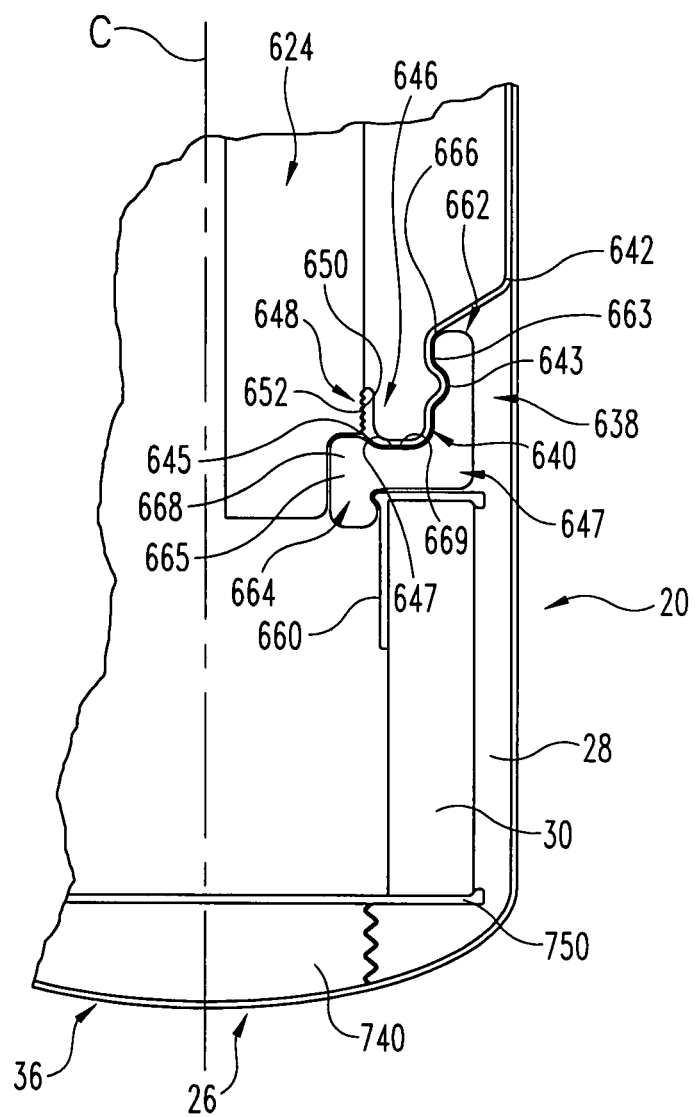
FIG. 11 is a partial, diagrammatic, sectional view of a fuel filter.

Referring now to FIG. 11, mounting element 642 of filter mount 638 includes a mounting engagement portion 646 in the form of mounting plate 647 operable to interface with an interface engagement portion 648 of mounting interface 624 to couple filter 20 to mounting interface 624. FIG. 11 is a cross-sectional view of a generally annular structure that is symmetric about axis centerline axis C. Mounting plate 647 includes threading 650 operable to engage complimentary threads 652 included on interface engagement portion 648. As depicted mounting plate 647 can be considered a type of nutplate and mounting interface 624 can be considered a type of threaded stem or spud typical of replaceable engine filter interfacing. Upper vibration dampener 640 is positioned between mounting element 642 and filter element 30 to provide vibration dampening for filter 20. In one form, upper vibration dampener 640 is molded to an upper endplate 660 coupled to filter element 30 and includes an upper portion 662 and a lower portion 664. In other forms, upper vibration dampener 640 may be coupled to a molded interface (not shown) on upper endplate 660. To prevent undesired mixing of filtered and un-filtered fluid, upper vibration dampener 640 is operable to seal filtered fluid from un-filtered fluid while also reducing or eliminating vibration transmission to filter 20 through mounting interface 624. Upper portion 662 of dampener 640 includes a lip 663 structured to fit over radially extending rim protrusion 643 of mounting plate 647, cooperating therewith to provide a radial seal 666. Lower portion 664 of dampener 640 includes a lip 665 structured to engage inner wall 645 of mounting plate 647, cooperating therewith to provide another includes radial seal 668. It should be appreciated that mounting plate 647 defines a rim 649 that is received in channel 669 formed by dampener 640 as depicted in FIG. 11.

Lower vibration dampener 740 is positioned between free end wall 36 and filter element 30 to provide vibration dampening for filter 20. Lower vibration dampener 740 is an accordion shaped rubber grommet molded to a lower endplate 750 coupled to filter element 30 and is positioned fully within interior space 28. Lower vibration dampener 740 is operable to provide vertical displacement or float of filter element 30 while simultaneously isolating filter element 30 from vibration and the effects of vibration. In some forms of the present application, lower vibration dampener 740 and filter element 30 may be carried together in a replaceable subassembly of filter 20. In one form, lower vibration dampener 740 is coupled to a molded interface (not shown) of lower endplate 750 as opposed to being integrally molded to lower endplate 750. In another form, lower vibration dampener 740 is provided only partially within interior space 28. In still another form of the present application, lower vibration dampener 740 may be located fully within dome 26. It is envisioned that lower vibration dampener 740 may be formed from the same or a different material as the lower endplate 750.

As discussed above, vibrations from engine 112 and/or vehicle 100 potentially carry throughout filter 20 effecting filter efficiency. Vibration dampener 640 reduces vibration transmission to filter 20 by absorbing or minimizing vibrations at the location where the filter 20 mounts to mounting interface 624 and vibration dampener 740 provides additional dampening by absorbing or minimizing vibrations transmitted to filter 20.

It should be appreciated that the vibration dampeners of the present application include vibration isolators and absorbers, which may be used singly, integrally, and/or in the form of one or more separate devices. Generally, an isolator includes structure which reduces the transmission of energy from one body to another and in effect reduces the amplitude of resonance frequencies. A few nonlimiting examples includes rubber isolators on brackets or mounting plates or a shock absorber that uses fluid release to dampen the shock or returned energy. Generally, a vibration absorber is a mechanism that can be modeled with a mass and spring (not necessarily a physical spring but something with a spring constant) which is attached to the system of interest. When an absorbing mass-spring system is attached to the main mass system, the resonance of the absorber is tuned to match that of the main mass, the amplitude motion of the main mass effectively becomes zero at its resonance frequency. The energy of the system becomes absorbed by the tuned vibration absorber because the system has changed from a 1-degree to two-degree of freedom system and contains two new frequencies neither one the same as the original in one nonlimiting example. Combinations of these can be used together to further tune the system. For instance, a fluid (damping component) contained mass spring system combines both approaches.

While the present application was described with reference to particular embodiments, it is envisioned that a filter or filter system may utilize one or more of the embodiments in combination or collectively. Many different embodiments of the present application are envisioned. For example, a further embodiment of the present application comprises an engine liquid filter that includes: a housing defining an interior space and extending from a mounting interface to a dome, the mounting interface defining at least one inlet for receiving liquid to be filtered and at least one outlet for discharging filtered liquid, the dome defining an free end wall of the engine fluid filter when the engine fluid filter is mounted at the mounting interface; a filter element positioned in the interior space, the filter element being structured to convert the liquid to be filtered to the filtered liquid by passage therethrough; and a vibration dampener positioned in the interior space between the free end wall and the filter element.

Another embodiment example comprises an engine liquid filter that includes: a housing defining an interior space and a mounting interface opposite a dome, the mounting interface defining at least one inlet for receiving liquid to be filtered and at least one outlet for discharging filtered liquid and an interior space; a filter element positioned in the interior space between the mounting interface and the dome, the filter being in fluid communication with the inlet and the outlet and structured to convert the liquid to be filtered to the filtered liquid by passage therethrough; and a vibration dampener positioned to extend into the interior space from the mounting interface.

Still another example comprises a replaceable filter device structured for insertion in a filter housing to filter a received liquid, that includes: a filter element comprising a material selected to filter one or more constituents out of the received liquid by passage through the material to provide a filtered liquid discharge; and a vibration dampener connected to the filter element to be carried therewith, the vibration dampener having selected mass and elasticity characteristics to provide a degree of vibration isolation at one or more resonant frequencies when the replaceable filter device is in use in the filter housing.

Yet another example comprises an engine system including a filter mounting interface for engine liquid filtering; a vibration dampener carried with the mounting interface; a filter coupled to the mounting interface to receive unfiltered engine liquid and discharge filtered engine liquid, the filter including a housing defining an interior space and a filter element positioned in the interior space, the filter being structured to convert the liquid to be filtered to the filtered liquid by passage therethrough; and wherein the vibration dampener engages the filter mounting interface and the filter when the filter is mounted to the mounting interface to provide a desired degree of vibration isolation.

Still a further example comprises an engine fluid filter including a housing defining an interior space and extending from a mounting element to a free end wall; a fluid inlet operable to receive fluid to be filtered; a filter element positioned in the interior space and structured to convert fluid to be filtered to the filtered fluid by passage therethrough; a first and second endplates coupled to the filter element; a first vibration dampener coupled to the first endplate, the first vibration dampener operable to seal fluid to be filtered from filtered fluid; and a second vibration dampener coupled to the second endplate, the second vibration dampener positioned in the interior space between the free end wall and the filter element.

Any theory, mechanism of operation, proof, or finding stated herein is meant to further enhance understanding of the present application and is not intended to make the present application in any way dependent upon such theory, mechanism of operation, proof, or finding. It should be understood that any use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. An apparatus, comprising: a fluid filter including:
 a housing defining an interior space and extending from a mounting interface to a dome, the mounting interface defining at least one inlet for receiving fluid to be filtered and at least one outlet for discharging filtered fluid, the dome defining an free end wall of the fluid filter when the fluid filter is mounted at the mounting interface;
 a filter element positioned in the interior space, the filter element being structured to convert the liquid to be filtered to the filtered fluid by passage therethrough; and
 a vibration dampener positioned in the interior space between the free end wall and the filter element, the vibration dampener including an elastomeric element compressibly contacting the end wall, the elastomeric element being configured to reduce vibration energy,
 wherein the vibration dampener further includes at least one spring connecting the filter element and the elastomeric element,
 the at least one spring includes an upper spring portion that contacts a lower end of the filter element, and
 the elastomeric element includes an upper engagement end contacting a lower spring portion of the at least one spring, a lower engagement end contacting the end wall, and a body defined between the upper engagement end and the lower engagement end.

\* \* \* \* \*